June 7, 1932.                J. H. GRAYSON                1,862,183
                             OVEN REGULATOR
                   Filed May 19, 1930         3 Sheets-Sheet 1

June 7, 1932.  J. H. GRAYSON  1,862,183
OVEN REGULATOR
Filed May 19, 1930  3 Sheets-Sheet 2

Inventor:
John H. Grayson
By Wilson, Dowell, McCanna & Gehm
Attys.

Patented June 7, 1932

1,862,183

UNITED STATES PATENT OFFICE

JOHN H. GRAYSON, OF LYNWOOD, CALIFORNIA, ASSIGNOR TO GRAYSON HEAT CONTROL, INC., OF LYNWOOD, CALIFORNIA, A CORPORATION OF CALIFORNIA

OVEN REGULATOR

Application filed May 19, 1930. Serial No. 453,682.

This invention relates to automatic temperature regulating devices generally and has more particular reference to an automatic oven regulator for gas ranges.

Automatic oven regulators now available have given fair satisfaction but have been subject to certain rather serious objections which it is the general object of this invention to overcome. First of all, they required a multiplicity of pipes, fittings, and other miscellaneous parts for the connection thereof between the cock at the manifold and the oven burner, which meant high material cost, high assembling cost, and the uncertainty as to whether the various threaded connections would remain gas-tight, especially after some service during which the parts are naturally subjected to considerable heating, apt to cause sealing compounds to dry out. My invention, therefore, contemplates the elimination of as many parts, and accordingly as many assembling operations, as possible, with a view to lowering the cost of production and assembling, and for better serviceability. Secondly, the oven regulators now available generally have too much thereof exposed to be in keeping with the present trend in gas range design which, as is well known, is more and more toward concealment of parts that do not add to the ornamental appearance, or if anything, are apt to be detractive so far as appearances are concerned. My invention, therefore, further contemplates an oven regulator which, with the exception of the dial and pointer required to indicate the temperature selected, is entirely concealed, thus making for neatness in appearance as well as adapting the device to use with practically any design of gas range.

Another object of my invention is to increase the accuracy of these devices partly by improvement in the design and construction, and partly by the use of stainless steel for all moving parts that would otherwise be subject to corrosion and, consequently, excessive wear.

Still another object consists in the provision of an adjustable by-pass in the regulator which, when the regulator shuts off the gas to the burner, by-passes enough gas to keep a low flame. In that way there is never any occasion for puffing when the regulator valve opens again, and no unburned gas is allowed to escape into the room, where the stove is not equipped with a vent pipe, as is often the case, and there is, furthermore, no danger of asphyxiation resulting from the pilot light being extinguished accidentally.

The invention is illustrated in the accompanying drawings, in which—

The same reference numerals are applied to corresponding parts throughout the views.

Figure 1:
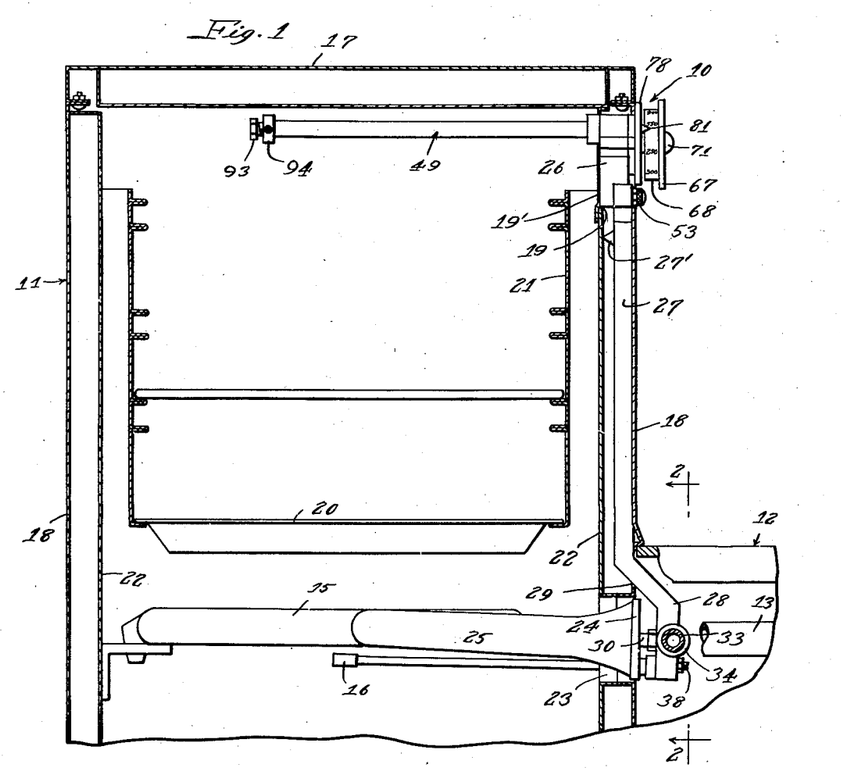
Figure 1 is a transverse vertical section through the oven section of a gas range showing the automatic oven regulator of my invention installed therein.
Figure 2:
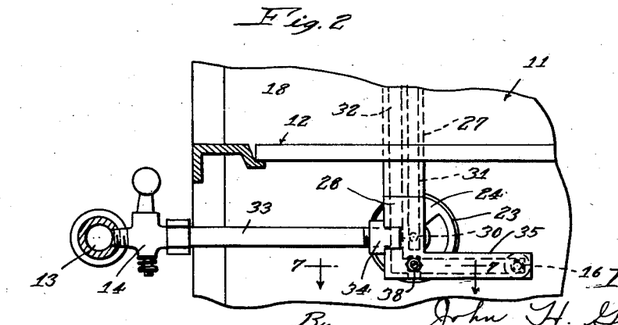
Fig. 2 is a sectional detail on the line 2—2 of Figure 1.

The automatic oven regulator of my invention, designated generally by the reference numeral 10, is adaptable to ranges having ovens of any ordinary construction. That shown in Figs. 1 and 2 has the usual oven section 11 next to the cooking top 12. A manifold 13 at the front of the cooking top has a cock 14 which, when opened, is arranged to deliver gas to the oven burner 15 under the control of the oven regulator 10. A pilot light 16 may or may not be provided for the oven burner, depending on whether the stove is equipped with an automatic oven lighter of the kind well known in this art. The oven is shown as having a sheet metal top wall 17 and side walls 18. The oven insides consist of a baking oven bottom 20 above the burner 15 supported in part by side linings 21. The latter are suitably supported in spaced relation to the inner side walls 22 which, in connection with the outer side walls 18, provide for insulating air chambers in the side walls of the oven or chambers that are adapted to be filled with suitable insulating material. Special mention is made of these insulating chambers because the automatic oven regulator is installed substantially entirely in the insulating chamber on the side toward the cooking top, as will presently appear. Flanged registering openings are provided in the inner and outer side walls of the oven under the cooking top, as appears at 23, for reception of the usual mixer 24 provided on the mixing tube 25 extending with a certain amount of downward inclination from the burner 15. An opening is provided in a similar way for the extension of the pilot light tube through the oven wall from the outside, the said pilot light tube, when one is provided, constituting part of the automatic oven regulator assembly, as will hereinafter appear.

Figure 7:
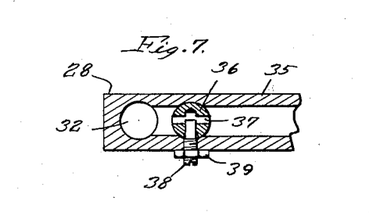
Fig. 7 is a horizontal sectional detail on an enlarged scale taken on the line 7—7 of Fig. 2.

The oven regulator 10 comprises a cast valve or control casing 26 disposed entirely within the insulating chamber between the outer and inner side walls 18 and 22 of the oven and fastened to the upper end of a cast manifold 27, which is also disposed in said chamber, and which extends downwardly therein and has its offset lower end 28 extended out through an opening 29 provided in the outer side wall 18, below the cooking top. A nipple 30 is provided on the offset lower end 28 of the manifold over which the mixer 24 of the oven burner is slipped in the usual way, the nipple 30 having communication with a longitudinal passage 31 cored in the manifold for the delivery of gas to the burner from the regulator. It is clearly shown in Figure 1 that the offset lower end 28 of the manifold is disposed at an acute angle with reference to the rest of the manifold so as to support the nipple 30 coaxially with the inclined mixing tube 25 of the burner. This arrangement lessens the back pressure effect of the burner and minimizes the likelihood of gas escaping at the mixer, and makes for more efficient operation, especially with a low flame. Another longitudinal passage 32 is cored in the manifold 27 for the inlet of gas from the oven cock 14 through a pipe 33 threaded into the neck 34 provided on the manifold. A rearward hollow extension 35 is provided on the offset lower end of the manifold to establish direct communication for the pilot light with the oven cock. A plug 36 closes the passage in the extension 35, as clearly shown in Fig. 7, and has a small hole 37 provided therein through which the gas is arranged to be delivered to the pilot light when the oven cock is opened. A threaded plug type valve 38 is provided in connection with the hole 37 to cut down the flow of gas to the pilot light as desired, and a lock nut 39 threads on the plug and is arranged when tightened to hold it securely in adjusted position. Obviously, the pilot adjustment when once made is rarely, if ever, changed. From this much description it will be seen that I have replaced the numerous pipes and fittings with one simple casting. This naturally means a considerable saving in material cost, and cuts down the assembling operations to a minimum so that an appreciable saving in the labor cost of installation is realized. But aside from the matter of savings in cost, it is obvious that this construction is far superior to those which involved the threading together of numerous parts, because there is no uncertainty as to whether the assembly will remain gas-tight in service, owing to the fact that sealing compounds do not have to be relied upon, there being no joints of a kind requiring the use of sealing compounds. In passing, attention is called to the small conical projection 27' cast integral on the back of the manifold 27 near the upper end thereof and arranged to bear against the inner side wall 22 to hold the manifold 27 in the position shown in Figure 1 preparatory to the assembling of the valve casing 26 thereon. This projection also serves to hold the manifold and valve casing assembly in the position shown when the cover plate 78, hereinafter described, is removed from the valve casing, at which time there is nothing else to keep the assembly in position, although, of course, it is obvious that very little movement of the parts would be apt to result from mere removal of the cover plate, especially when it is considered that the manifold would, under such circumstances, still be supported by its connection at 30 with the oven burner.

Figure 6:
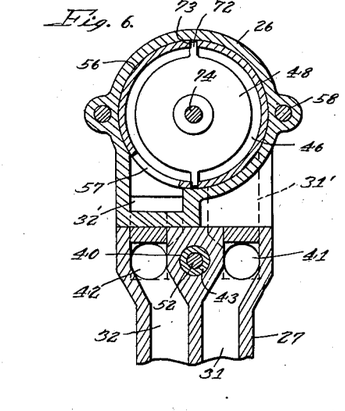
Fig. 6 is a vertical section on the line 6—6 of Fig. 3.

A hole 40 is provided through the upper end of the manifold 27 between the diverging upper ends of the passages 31 and 32, as best appears in Fig. 6, and holes 41 and 42 are provided in the back wall of the manifold to communicate with the upper ends of the passages 31 and 32, respectively. A stud 43, threaded in the middle of the lower end of the valve casing 26 between the lower ends of two passages 31' and 32' cored in said casing, is arranged to be slipped through the hole 40 from behind the manifold 27 and to receive a nut 44, the tightening of which serves to draw the parts together and compress a suitable gasket 45 therebetween, whereby to place the passages 31 and 31' and the passages 32 and 32' in communication with one another and prevent leakage of gas at the joint. It will be seen that this arrangement permits assembling of the valve casing 26 on the manifold 27 from the inside of the oven, the inner side wall 22 having an opening 19 to permit the passage therethrough of the casing 26. The nut 44 is, of course, applied to the stud 43 from the outside of the oven. A hole 54 is provided in the outer side wall 18 of the oven to permit the jamming of the nut 44 against the front of the manifold in the tightening thereof. A small sheet metal plate 19' is suitably provided for closing the opening 19 after the assembling of the valve casing 26 on the manifold 27, as just described. Thus, the valve casing 26, like the manifold 27, is entirely concealed and does not constitute a more or less unsightly projection on the outside of the oven, as is the case with the oven regulators now commonly available. It will presently appear that, although the valve casing is mounted in concealment inside the oven, the valve is, nevertheless, arranged for easy removal therefrom from outside the oven for inspection or cleaning.

Figure 5:
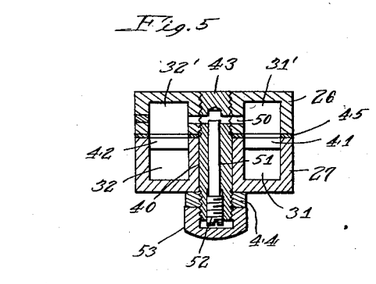
Fig. 5 is a horizontal section on the line 5—5 of Fig. 4.
Figures 8, 9, 10, 11, 12:
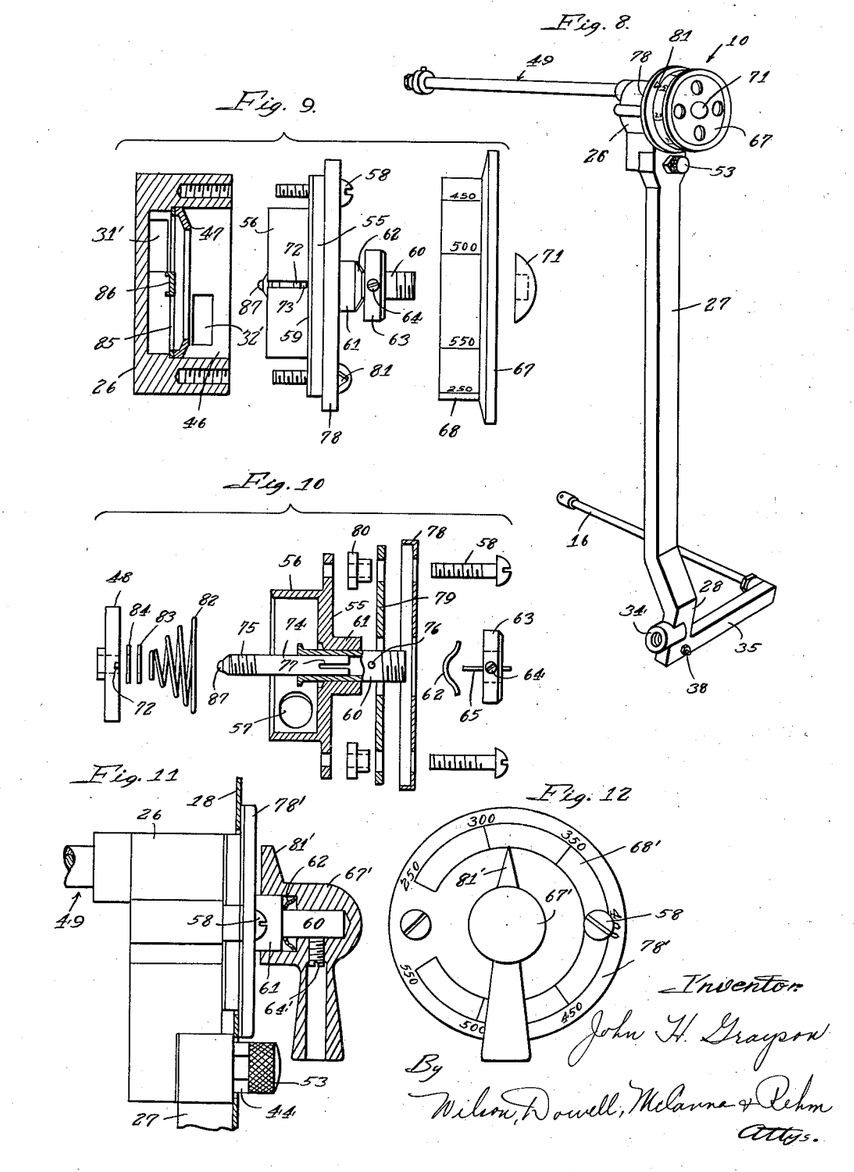
Fig. 8 is a perspective view of the oven regulator showing the parts thereof as they would appear assembled outside the oven.
Fig. 9 is a view of the parts of the valve casing and the dial shown in partly disassembled relation, the valve casing appearing in horizontal section, and the other parts in top elevation.
Fig. 10 is a similar kind of view showing the parts of the valve assembly in disassembled relation, most of the parts appearing in horizontal section.
Fig. 11 is a view somewhat similar to Fig. 3 but only partly in vertical section showing a slightly modified construction utilizing an ordinary knob with a pointer thereon cooperating with a dial, instead of the rotary dial shown in the other views.
Fig. 12 is a face view of the knob and dial of Fig. 11.

The passages 31' and 32' open into the valve chamber 46, the former behind and the latter in front of the valve seat 47 (see Figs. 6 and 9). A valve 48 is provided for cooperation with the seat 47, as hereinafter more fully described, and the closing of this valve is, therefore, arranged to prevent the flow of gas from the passage 32 through the valve casing to the passage 31 for delivery to the oven burner, even though the oven cock is opened. The valve, as hereinafter described, is arranged to be automatically opened and closed according to the heating of a thermostat 49 projecting from the valve casing crosswise of the top of the oven. I prefer to by-pass a small amount of gas from the inlet passage 32 to the delivery passage 31 to keep the oven burner burning with a low flame when the regulator valve is entirely closed, because in that way there is avoided the puffing going with repeated ignition of the burner and the objection of a certain amount of unburned gas being allowed to escape into the room, owing to slow ignition of the burner. This also avoids any possible danger of asphyxiation such as might result if the pilot light happened to be extinguished before the regulator valve opened again. Of course, where there is an automatic oven lighter, at least that danger is avoided, but even there I believe there is a sufficient advantage in not having the oven burner completely extinguished, to warrant the slight additional expense involved in providing a by-pass on the regulator. A hole 50 is drilled from the passage 32' through the rear end of the stud 43 to the passage 31', as shown in Fig. 5, the registering hole made in the outside wall of the passage 32' being suitably plugged after the drilling operation, as indicated. An axial hole 51 is provided in the stud 43 in the outer end of which a plug type valve 52 is threaded and so adjusted that when the oven burner is lit and the regulator valve is closed, there is just enough gas allowed to flow through the hole 50 to keep the oven burner burning with a low flame, not enough to affect the oven temperature appreciably. A cap 53 threads on the end of the stud 43 projecting beyond the nut 44, as shown in Fig. 5, and serves to conceal the plug valve 52 and at the same time cover up the nut 44 so as to make for neat appearance.

A plug 55 is provided as a closure for the valve chamber 46 of the casing 26, and has a sleeve portion 56 arranged to fit snugly inside the chamber 46. A hole 57 is provided in the wall of the sleeve portion so as not to cut off communication between the valve chamber and the passage 32' (see Fig. 6). Screws 58 serve to fasten the plug to the valve casing, and a suitable gasket 59 is provided to seal the joint between the plug and casing. A sleeve 60 is slipped through a center hole in the plug 55 where a cylindrical hub 61 is also provided, and has an annular flange on the inner end thereof arranged to fit in an annular groove provided therefor in the plug. A bowed spring washer 62 fits about the projecting outer end of the sleeve 60 behind a collar 63 which is slipped over the sleeve and fastened in place thereon by means of a set screw 64, keeping the spring washer 62 under compression between the hub 61 and the collar so as to prevent end play of the parts. A pin 65, mounted in the rim portion of the collar 63 and disposed parallel to the sleeve, has one end arranged to engage a pin 66 projecting radially from the hub 61, whereby to limit the turning of the collar 63 to approximately one complete revolution, for a purpose which will presently appear. A wheel 67 of bakelite or other suitable material has a ring-shaped dial 68 on the rim thereof held in place suitably by a set screw 69, and is arranged to fit over the projecting outer end of the sleeve 60 and over the collar 63, and has a small hole 70 provided therein for reception of the projecting end of the pin 65. Thus, when a nut 71 is threaded on the outer end of the sleeve 60 so as to hold the wheel 67 in place on the sleeve, the sleeve is arranged to be turned by means of the wheel by virtue of the pin connection between the wheel and collar. The valve 48 previously mentioned is in the form of a disc having an annular knife edge on the rim thereof for engagement with the valve seat 47, and has lugs 72 extending from diametrically opposite sides slidably received in slots 73 provided in the sleeve portion 56 of the plug 55 for holding the valve against turning. In other words, the valve is limited simply to movement toward and away from the valve seat. A valve stem 74 threads in a central hub provided on the valve 48, and is slidably received in the sleeve 60. A cross pin 76 in the sleeve 60 is slidably received in a diametrical slot 77 provided in the outer end of the stem 74, whereby to cause the stem 74 to turn with the sleeve 60 while still allowing the stem to move axially back and forth in the sleeve. Thus, it will be seen that when the wheel 67 is turned, the turning of the sleeve 60 causes the stem 74 to be turned relative to the valve 48 and thereby move the valve 48 toward or away from the valve seat 47, depending on which direction the wheel 67 is turned. Right hand threads are indicated at 75; hence, the turning of the wheel 67 in a clockwise direction as viewed from the right in Fig. 3, will cause the valve 48 to move to the right away from the valve seat 47, and vice versa. Higher oven temperatures are obtained, therefore, by turning the wheel clockwise, and the dial 68 is marked accordingly, as appears in Fig. 9. An annularly rimmed cover plate 78, suitably nickel plated or otherwise finished on the outside thereof for good appearance, fits over the hub 61 of the plug 55 on the outside of the oven, and the screws 58 pass therethrough to fasten the plug 55 to the valve casing 26, so that the assembly inside the oven is fastened rigidly to the outer side wall 18 of the oven. The heads of the screws 58 come within the rim of the wheel 67 and, as appears in Fig. 3, the wheel is close enough to the cover plate 78 so that the screw heads do not show. A disc 79, suitably of heat insulating material, such as asbestos, is fitted inside the cover plate 78, and spacing washers 80 are also provided for abutment with the outside of the oven wall 18 so as to permit tightening of the screws 58 without buckling the cover plate. A triangular pointer 81 is suitably punched from the plate 78 projecting over the rim of the wheel 67 for coöperation with the dial 68. Thus, in selecting the oven temperature desired, the wheel 67 is simply turned one way or the other until the proper reading appears opposite the pointer, in a well known manner. In the assembling of the regulator at the factory, the collar 63 is fastened to the sleeve 60 by means of the set screw 64, when the wheel 67 is turned to bring the dial 68 to a position where its reading, indicated by the pointer 81, agrees with the oven temperature, as indicated by a thermometer in the oven. In passing, it is thought to be evident that the removal of the nut 71 permits removal of the wheel 67, and then the screws 58 can be unthreaded to permit withdrawal of the complete valve assembly appearing in the middle of Fig. 9. Thus, the valve is easily accessible from the outside of the oven for inspection or cleaning, despite the fact that the valve casing is disposed in concealment inside the oven.

A helical spring 82 fits about the stem 74 and is compressed between the valve 48 and the inside of the plug 55 so that it tends to move the valve toward its seat 47. A washer 83 and a gasket 84 fit about the stem 74 between the small end of the spring and the back of the valve 48 so that the gasket seals the threaded joint between the stem and the valve and prevents likelihood of leakage at this point when the valve is closed. The stem 74 and valve 48 are made of stainless steel which is not subject to corrosion at the temperatures to which the parts are subjected in the present case. Thus, there is not apt to be enough wear at the threaded connection between the stem and the valve to result in destroying the accuracy of the regulator. The valve seat 47 is in the form of a ring pressed into the valve chamber 46 to the position shown in Fig. 3. This part is also preferably of stainless steel so that there is no danger of corrosion of the valve seat, such as might result in leakage past the valve when the same is closed. The valve seat ring holds in place another ring 85 which at one point has a radial lever 86 formed integral therewith, the ring and lever being suitably stamped from a piece of sheet metal, and the lever portion being preferably formed to the channel-shaped cross-section indicated most clearly in Fig. 9, which insures the desired stiffness. The inner end of the lever 86 has point contact with a hardened steel ball 87 set in a recess in the end of the valve stem 74 and suitably held in place therein, as by swedging. Aligned V-shaped notches 88 are cut in the flanges of the lever 86 near the outer end thereof for reception of a transverse knife edge 89 provided on a plug 90 fitted in a hole in the inner end of the rod element 91 of the thermostat 49. The tube element 92 of the thermostat is externally threaded at one end to thread into the valve casing, as shown, and at the other end is internally threaded to receive a plug 93 abutting the outer end of the rod element 91. A ring 94 fits about the outer end of the tube element, and when the plug 93 is properly adjusted, the set screw 95 in said ring is tightened to distort the end of the tube element enough to hold the screw in adjusted position. The rod and tube elements 91 and 92, respectively, may be of any suitable or preferred materials; the rod 91 may, for example, be of carbon and the tube 92 of copper, the former having a low coefficient of expansion, and the latter having a high coefficient of expansion.

Figure 3:
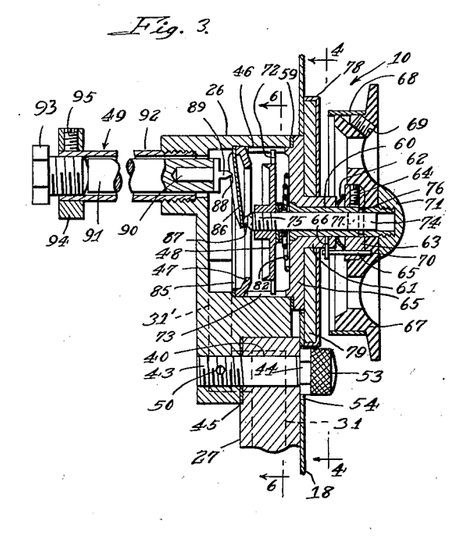
Fig. 3 is an enlarged central vertical section through the valve casing of the regulator and the rotary dial therefor.
Figure 4:
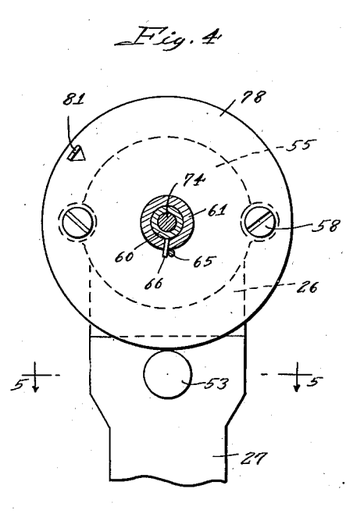
Fig. 4 is a vertical section in a transverse plane taken on the line 4—4 of Fig. 3.

In operation, when the oven is cold, the contraction of the tube element causes the movement of the rod element 91 to the right, as viewed in Fig. 3, so as to open the valve 48. The amplification afforded by the fulcrum lever 86 being about 3:1, the valve 48 is accordingly opened a distance corresponding to approximately three times the amount of contraction of the tube element 92. In Fig. 3 the valve 48 is shown wide open and in a position with respect to the valve stem 74 corresponding to the highest temperature indicated on the dial 68. Consequently, the oven will have to be heated up to that temperature before the valve will close following expansion of the tube element 92. If, however, the wheel 67 is turned in a counter-clockwise direction when the valve 48 is opened, as shown in Fig. 3, the valve 48 is brought closer to its seat and, hence, will close at a lower oven temperature, that is, upon less expansion of the tube element 92, than would otherwise be the case, and vice versa. It is, of course, true that the valve 48 will not close entirely under average operating conditions, but will, under control of the thermostat, simply vary the extent of its opening to regulate the amount of gas supplied to the burner so as to maintain a predetermined selected temperature. However, in the case of low temperature settings where the valve is open very little at any time and is apt to be closed entirely at times, the by-pass 50 then comes into play to keep the burner from going out entirely, a very low flame being kept burning as a result of the gas delivered to the burner through the by-pass so as to avoid the necessity for relighting, and the objection of puffing, and the escape of unburned gas from the stove, as well as the possible danger of asphyxiation, as above pointed out.

In Figs. 11 and 12, I have shown a slight modification where a knob 67' is mounted on the outer end of the sleeve 60 in place of the wheel 67 and is provided with a pointer 81' to cooperate with a dial 68' provided on the cover plate 78'. This construction is much simpler and cheaper than the other and might be preferred by some stove manufacturers. It will be observed that the knob 67' makes it unnecessary to provide the collar 63, because the screw 64' can be provided in the knob in the manner indicated to set the knob with reference to the sleeve 60. In this case as in the other, the bowed spring washer 62 bearing against the hub 61 is placed under compression and holds the parts against end play.

In both forms of my invention, the concealment of the manifold and control casing makes for much better appearance than was obtained where the control casing had to be exposed. Despite the concealment of the control casing, it is evident that the assembling thereof on the manifold from within the oven is an extremely simple matter, just as simple an assembling operation as was involved where the control casing was exposed. Furthermore, it is evident that, with my construction, it is just as simple a matter to get at the valve for cleaning the same as it was where the control casing was exposed. The substantially flush side wall that is presented when the oven regulator is installed in accordance with my invention, in addition to being neater in appearance, makes it a much simpler matter to keep the stove clean.

It is believed the foregoing description conveys a good understanding of all of the objects and advantages of my invention. I fully realize that many changes might be made in certain details of construction and arrangement without seriously departing from the spirit and scope of the invention, and it should, therefore, be understood that the invention is not limited to the specific details herein illustrated and described, excepting only as necessitated by the state of the prior art.

I claim:

1. In a fuel control system, an oven having fuel conducting means concealed therein, heat responsive means within the oven, and a control casing for said heat responsive means having a valve therein for controlling the flow of fuel through the fuel conducting means, said casing being also concealed in said oven and having direct connection therein with the fuel conducting means, and said valve being removable from said casing from the outside of the oven with said casing in position therein.

2. In a fuel control system, an oven having fuel conducting means concealed therein, heat responsive means within the oven, and a control casing for said heat responsive means having a valve therein for controlling the flow of fuel through the fuel conducting means, said casing being concealed in said oven for direct detachable connection therein with the fuel conducting means and being bodily removable from within said oven with said means in position therein, and said valve being removable from said casing from the outside of the oven with said casing in position therein.

3. In a fuel control system, an oven, a fuel conduit concealed by said oven, heat responsive means within the oven, a control casing for said heat responsive means also concealed by said oven, and means accessible from outside the oven for detachably connecting the control casing with the fuel conduit.

4. In a fuel control system, an oven, a fuel conduit concealed by said oven, heat responsive means within the oven, a control casing for said heat responsive means also concealed by said oven, means accessible from outside the oven for detachably connecting the control casing with the fuel conduit, and means for attaching the control casing to the oven from the outside thereof.

5. In an oven comprising spaced inner and outer walls, a manifold disposed between said walls and extending downwardly for connection with the oven burner, said manifold having two passages provided therein for leading to and from the control casing, the one passage being arranged to have fuel supplied thereto, and the other passage being arranged to communicate with the oven burner for the delivery of fuel thereto, heat responsive means inside the oven, and a control casing for the heat responsive means disposed between said walls with the manifold, the said casing having a valve therein and having two passages therein communicating with opposite sides of the valve and arranged to be placed in communication with the passages in the manifold, the upper end of said manifold and a portion of said casing being conformed for direct engagement with each other for detachable coupling purposes whereby to place the passages of the manifold in communication with the passages in the casing, and means for fastening the manifold and casing portions together.

6. A structure as set forth in claim 5 wherein the last mentioned means comprises a bolt passing through the manifold and casing portions between the passages thereof, the said bolt being accessible from outside the oven, there being a transverse opening through the bolt, for establishing communication between the passages for by-passing of fuel with respect to the casing from one passage of the manifold to the other, and an adjustable valve in said bolt accessible from the outside of the oven for regulating the flow of fuel through the by-pass opening.

7. In a fuel control system for an oven having an oven burner and an oven cock for supplying gas thereto, a manifold having two passages provided therein for leading to and from the oven regulator, means for supplying gas from the cock to one of said passages, there being an extension of said manifold communicating with said passage, a pilot light tube on said extension, means for establishing communication between the other passage of the manifold and the oven burner, an oven regulator casing having a valve therein and having two passages provided therein communicating with opposite sides of the valve, the said passages being arranged to communicate with the passages of the manifold, and means for fastening the regulator casing to the manifold to establish communication between the passages.

8. In a gas stove comprising a cooking top and an oven section alongside the same, the latter having spaced inner and outer side walls, an oven burner in said oven section having the mixing tube thereof extending through an opening provided in the side of the oven beneath the cooking top, an oven regulator mounted on the same side of the oven above the cooking top, the same having a valve in the casing thereof and having passages in said casing communicating with opposite sides of the valve, and a manifold mounted between the inner and outer side walls of the oven extending downwardly from the oven regulator and having the lower end thereof offset and extended through an opening provided in the outer side wall of the oven, said manifold having two passages provided therein for communication with the passages in the regulator casing, the one being arranged to be supplied with gas from a source of gas supply, and a nipple projection on the offset lower end of said manifold communicating with the other passage and arranged to discharge into the mixing tube of the oven burner.

9. A structure as set forth in claim 8 wherein the mixing tube of the oven burner is inclined downwardly with reference to the plane of the burner at an acute angle, and wherein the offset lower end of the manifold is disposed approximately at right angles to the longitudinal axis of said tube with the nipple projection thereon having its axis parallel to the tube axis substantially as and for the purposes described.

10. A structure as set forth in claim 8 including a pilot light tube for the oven burner and an extension on said manifold communicating with said tube and having communication with the passage in said manifold to which gas is supplied from the source of gas supply.

11. A structure as set forth in claim 8 wherein the oven regulator casing is detachably connected with the upper end of the manifold, the said structure including a projection on one side of the manifold for engagement with the inside of one of the oven walls for holding said manifold in a predetermined position preparatory to the attachment of the casing thereto or following the removal of the casing therefrom.

12. A structure as set forth in claim 8 wherein the casing of the oven regulator is arranged to be detachably secured to the upper end of said manifold from within the oven, the said structure inclding means between the inner side wall of the oven and the manifold for holding the manifold in a predetermined position preparatory to the attachment of the casing thereto or following the removal of the casing therefrom.

13. A structure as set forth in claim 8 wherein the oven regulator casing is detachably connected with the upper end of the manifold from within the oven, the structure including means for attaching the casing to the outer side wall of the oven from outside thereof.

14. In an oven comprising spaced inner and outer side walls, fuel conducting means between said walls, heat responsive means in the oven, a control casing for the heat responsive means detachably connected with the fuel conducting means from within the oven and disposed with said means between said walls, said casing having the front thereof open and having a valve provided therein for controlling the flow of fuel through the fuel conducting means, there being an opening provided in the outer side wall adjacent said casing affording access to the open front thereof, a closure for said casing insertible and removable through said opening whereby to afford access to the valve from outside the oven for cleaning thereof, and means for fastening said closure to the casing.

15. In an oven comprising spaced inner and outer side walls, fuel conducting means between said walls, heat responsive means in the oven, a control casing for the heat responsive means detachably connected with the fuel conducting means from within the oven and disposed with said means between said walls, said casing having the front thereof open and having a valve provided therein for controlling the flow of fuel through the fuel conducting means, there being an opening provided in the outer side wall adjacent said casing affording access to the open front thereof, a closure for said casing insertible and removable through said opening whereby to afford access to the valve from outside the oven for cleaning thereof, and means for fastening said closure to the casing and serving to fasten the casing rigidly to the outer side wall of the oven.

16. In an oven comprising spaced inner and outer side walls, fuel conducting means between said walls, heat responsive means in the oven, a control casing for the heat responsive means detachably connected with the fuel conducting means from within the oven and disposed with said means between said walls, said casing having the front thereof open and having a valve provided therein for controlling the flow of fuel through the fuel conducting means, there being an opening provided in the outer side wall adjacent said casing affording access to the open front thereof, a closure for said casing insertible and removable through said opening whereby to afford access to the valve from outside the oven for cleaning thereof, a cover plate disposed outside the oven covering the opening provided therein and serving also to conceal the closure, and means for fastening the cover plate and closure together and to the casing whereby to hold the casing in a predetermined relation to the outer side wall of the oven.

17. In an oven comprising spaced inner and outer side walls, a fuel conduit disposed between said walls, a control casing also disposed between said walls behind said conduit, the conduit and casing having portions arranged to overlap for coupling purposes, the conduit having two passages therein for the flow of gas to and from the casing and the casing having passages arranged to be placed in communication with the conduit passages when the conduit and casing are coupled, the casing being attachable and removable from the conduit through an opening provided in the inner side wall of the oven, means for fastening the overlapping portions of the conduit and casing together, the said means being accessible through an opening provided in the outer side wall, the said casing being open at the front and there being an opening provided in the outer side wall registering therewith, a valve for said casing controlling the flow of fuel from the one passage in said casing to the other, and a closure for said casing insertible and removable through the last mentioned opening whereby to permit easy access to the valve for cleaning thereof.

18. In an oven comprising spaced inner and outer side walls, a fuel conduit disposed between said walls, a control casing also disposed between said walls behind said conduit, the conduit and casing having portions arranged to overlap for coupling purposes, the conduit having two passages therein for the flow of gas to and from the casing and the casing having passages arranged to be placed in communication with the conduit passages when the conduit and casing are coupled, the casing being attachable and removable from the conduit through an opening provided in the inner side wall of the oven, means for fastening the overlapping portions of the conduit and casing together, the said means being accessible through an opening provided in the outer side wall, the said casing being open at the front and there being an opening provided in the outer side wall registering therewith, a valve for said casing controlling the flow of fuel from the one passage in said casing to the other, a closure for said casing insertible and removable through the last mentioned opening whereby to permit easy access to the valve for cleaning thereof, a cover plate disposed outside the oven covering said opening and also concealing said closure, and means for fastening the cover plate and closure to the casing, the said means serving also to fasten the casing to the outer side wall of the oven.

19. In a thermostatic valve, the combination of a casing having a valve seat therein, a valve movable toward and away from said seat, a thermostat, means between the thermostat and valve for communicating amplified movement to the valve from the thermostat in response to temperature changes, a valve stem extending from the valve and threaded therein, means for holding the valve against turning whereby to permit adjustment of the valve with relation to the seat by turning the valve stem relative to the valve, and manually operable means for turning the stem.

20. In a thermostatic valve, the combination of a casing having a valve seat therein, a valve movable toward and away from said seat, a thermostat, means between the thermostat and valve for communicating amplified movement to the valve from the thermostat in response to temperature changes, a valve stem extending from the valve and threaded therein, means for holding the valve against turning whereby to permit adjustment of the valve with relation to the seat by turning the valve stem relative to the valve, a rotatable sleeve having the valve stem slidably but non-rotatably mounted therein, the said sleeve extending from the casing, and a manually operable member outside the casing secured to the sleeve for turning the same.

21. In a thermostatic valve, the combination of a casing having a valve seat therein, a closure affording access to the inside of said casing, a valve movable toward and away from the valve seat, a spring between the valve and closure normally urging the same toward the seat, a thermostat, means between the thermostat and valve for communicating amplified movement to the latter against the action of the spring away from the seat in response to temperature changes, a valve stem threaded in the valve and extending through the closure, means in said casing for holding the valve against turning while permitting movement thereof toward and away from the seat, and means operatively connected with the valve stem outside the casing for turning the same whereby to adjust the valve relative to the seat, said means permitting endwise movement of the stem relative thereto whereby to permit free movement of the valve toward or away from its seat under the action of the spring or thermostat.

22. In a thermostatic valve, the combination of a casing having a valve seat therein, a closure affording access to the inside of said casing, a valve movable toward and away from the valve seat, a spring between the valve and closure normally urging the same toward the seat, a thermostat, means between the thermostat and valve for communicating amplified movement to the latter against the action of the spring away from the seat in response to temperature changes, a valve stem threaded in the valve and extending through the closure, means in said casing for holding the valve against turning while permitting movement thereof toward and away from the seat, a sleeve rotatably mounted in the closure and extending from the casing and having the stem slidably received therein, means for holding the stem against turning relative to the sleeve, whereby to permit turning the same relative to the valve for adjustment of the valve relative to its seat, and a manually operable member mounted on said sleeve outside the casing for turning the same.

23. In a thermostatic valve, the combination of a casing having a valve seat therein, a closure affording access to the inside of said casing, a valve movable toward and away from the valve seat, a spring between the valve and closure normally urging the same toward the seat, a thermostat, means between the thermostat and valve for communicating amplified movement to the latter against the action of the spring away from the seat in response to temperature changes, a valve stem threaded in the valve and extending through the closure, means in said casing for holding the valve against turning while permitting movement thereof toward and away from the seat, a sleeve rotatably mounted in the closure and extending from the casing and having the stem slidably received therein, means for holding the stem against turning relative to the sleeve, whereby to permit turning the same relative to the valve for adjustment of the valve relative to its seat, a collar mounted on the sleeve outside the casing and arranged to be adjusted rotatably thereon and fixed thereto in adjusted position, means for limiting the turning of said collar to approximately one complete revolution, and a manually operable member mounted on the collar and sleeve outside the casing for communicating rotation to the sleeve, there being means for indicating the position of the member in terms of degrees in temperature.

24. In a thermostatic valve, the combination of a casing having a substantially cylindrical bore provided therein opening from one side of the casing, there being an annular shoulder at the inner end of said bore, a ring member fitting in said bore on said shoulder, a lever disposed substantially radially with reference to and extending from said ring to approximately the center thereof, a thermostat mounted on said casing having the movable element thereof operatively connected with said lever near the outer end thereof, a valve seat ring fitting in the bore next to the first ring and holding it in place, a valve guided for movement toward and away from the seat, spring means for moving said valve normally in one direction, said valve being arranged to be given amplified movement in the opposite direction by the free end of said lever in response to temperature changes, and means for adjusting the relation of said valve to said lever.

25. In a thermostatic valve, the combination of a casing having a substantially cylindrical bore provided therein opening from one side of the casing, there being an annular shoulder at the inner end of said bore, a ring member fitting in said bore on said shoulder, a lever disposed substantially radially with reference to and extending from said ring to approximately the center thereof, a thermostat mounted on said casing having the movable element thereof operatively connected with said lever near the outer end thereof, a valve seat ring fitting in the bore next to the first ring and holding it in place, a valve guided for movement toward and away from the seat, spring means for moving said valve normally in one direction, a valve stem extending through and threaded in the valve having the inner end thereof arranged for engagement by the free end of said lever for communicating amplified movement to the valve in the opposite direction in response to temperature changes, means for holding the valve against turning, and manually operable means for turning the valve stem whereby to adjust the relation of the valve to the thermostat.

26. In a thermostatic valve, the combination of a casing, having a valve seat therein, a valve guided for movement toward and away from said seat, a valve stem extending through and threaded in said valve, a fulcrum lever mounted substantially radially with reference to the valve having the outer end thereof suitably supported but having the inner end thereof engaging the end of the valve stem for communicating movement thereto, a thermostat mounted on the casing having the movable element thereof engaging said lever near the outer supported end thereof whereby to communicate amplified movement to the valve in response to temperature changes, a spring cooperating with the valve normally urging the same in one direction to keep the stem in proper engagement with the lever, means for holding the valve against turning while permitting free movement thereof toward and away from the valve seat, and manually operable means for turning the stem whereby to adjust the valve relative to the thermostat.

27. In a thermostatic valve, the combination of a casing having a valve seat therein, a plug constituting a closure for the open end of said casing and having a sleeve portion telescoping therein, a valve in said casing disposed substantially concentrically in said sleeve portion, means between the sleeve portion and the periphery of the valve for holding the latter against turning, such as one or more projections provided on the one part fitting slidably in one or more recesses provided on the other part, a valve stem threaded through the center of the valve and extending outwardly through the plug, manually operable means outside the casing cooperating with the stem for turning the same, whereby to adjust the valve in relation to the stem through the medium of the threaded connection therebetween, a compression spring encircling the stem between the plug and valve serving normally to urge the valve toward the valve seat, a thermostat, and movement amplification means between the thermostat and the valve stem for moving the valve away from the seat against the action of the spring.

In witness of the foregoing I affix my signature.

JOHN H. GRAYSON.